United States Patent Office 2,783,427
Patented Feb. 26, 1957

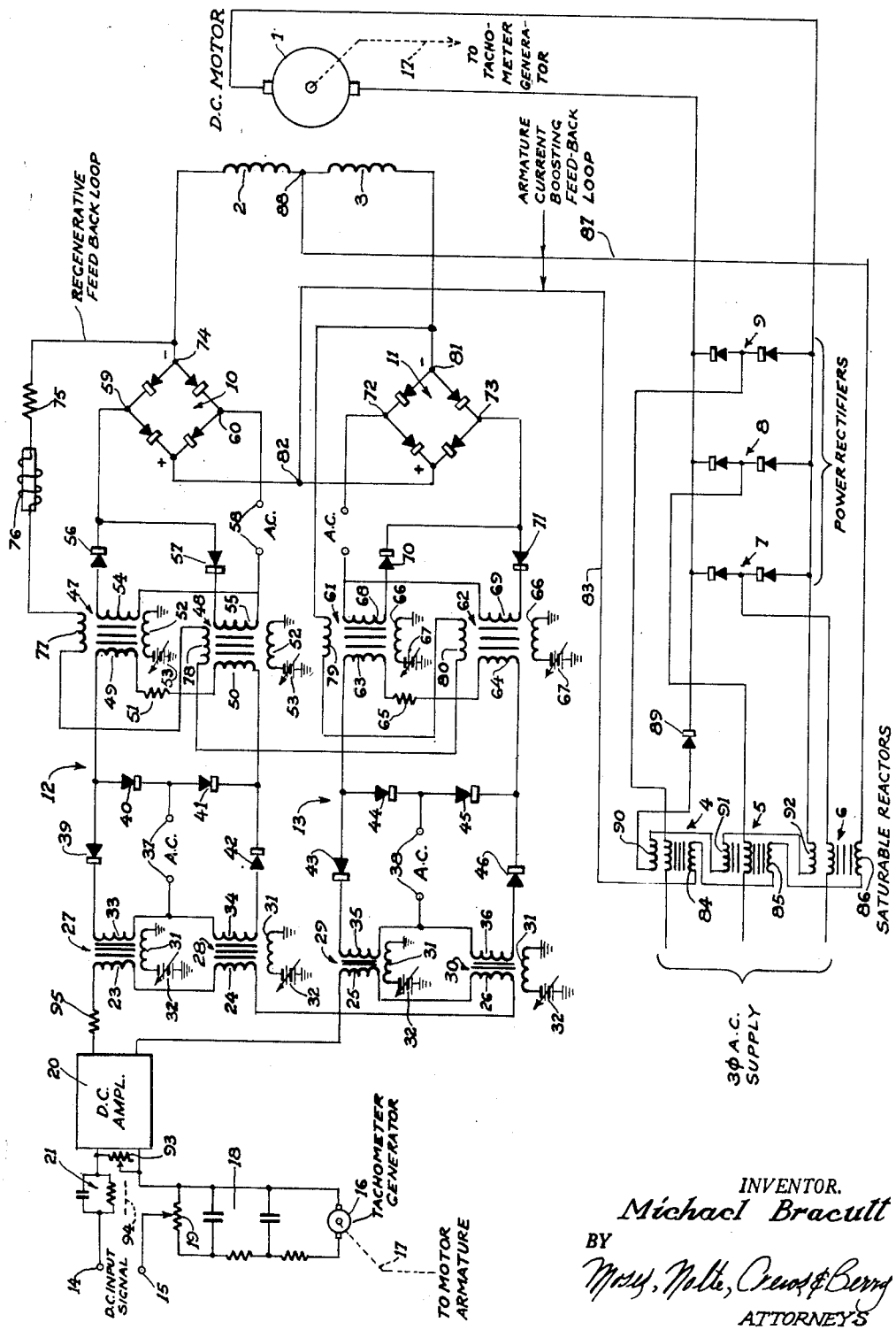

2,783,427
MOTOR CONTROL SYSTEMS

Michael Bracutt, East Orange, N. J., assignor to The W. L. Maxson Corporation, New York, N. Y., a corporation of New York Application July 10, 1953, Serial No. 367,266

20 Claims. (Cl. 318—338)

The present invention relates to direct current motor control systems and more particularly to control systems of this character which are suitable for the rapid and precise control of both the speed and direction of rotation of a direct current motor, together with any mechanical load which may be driven thereby.

The present invention embodies certain improvements over the control systems described in the application of Michael Bracutt, Serial No. 150,420, filed on March 18, 1950, now Patent No. 2,622,239, issued December 16, 1952, and in the application of Harold Levenstein and Michael Bracutt, Serial No. 257,484, filed on November 21, 1951, now Patent No. 2,709,234.

An object of the invention is to provide a motor control system employing a magnetic amplifier, and which includes a retarded regenerative feed back path extending from the field circuit of the controlled motor to the input of the magnetic amplifier for the purpose of improving the accuracy of the control system without introducing objectionable oscillatory or hunting effects.

Another object of the invention is to provide a control system of this character utilizing dynamic braking and in which the current flowing through the motor armature during dynamic braking is limited to prevent overheating and other undesirable effects.

A further object of the invention is the provision of a stabilizing network in the input of the control system, the stabilizing network including at least one reactive circuit element for producing a leading phase angle between variations in the input signal and the signal applied to the input of the remainder of the control system.

Still another object of the invention is to provide a control circuit suitable for use with a motor having a separate field winding for each direction of rotation and in which the coupling effect caused by mutual inductance between the two field windings is reduced by appropriately poled rectifiers.

A further object of the invention resides in the use of field current directly in the control windings of saturable reactors which control the armature current, in order to increase the armature current when the field current is increased. This feature not only provides increased torque for rapid armature acceleration, but also increases the field current to provide increased torque for continuous operation whenever the mechanical requirements of the motor load are such as to call for a greater torque.

A further object of the invention is the provision of a supplementary armature current control circuit which avoids a severe plugging condition and improves commutation during the period of armature deceleration by dynamic braking action in response to an input signal calling for a rapid reversal of the direction of armature rotation.

Other and further objects will become apparent upon reading the following specification together with the accompanying drawing forming a part hereof.

In the drawing, the single figure is a schematic electrical circuit diagram of an embodiment of the invention.

Referring to the drawing, a direct current motor is shown provided with an armature 1 and two field windings 2 and 3. Field winding 2 is arranged, when excited, to cause rotation of armature 1 in one direction and excitation of field winding 3 causes rotation of armature 1 in the opposite direction. The field windings 2 and 3 are separately and individually excited, one of the two windings being selected for excitation in accordance with the desired direction of rotation for the motor armature 1.

Current for the operation of the motor is shown by way of illustration as being derived from a source of three phase alternating current which is connected through three main saturable reactors 4, 5 and 6 to rectifiers 7, 8 and 9 connected in a three phase full-wave bridge arrangement. The saturable reactors 4, 5 and 6 inherently provide a generally constant armature current which is subject to control by control windings as more fully described below.

The motor field windings 2 and 3 are supplied with direct current from the outputs of two separate magnetic amplifiers designated generally as 12 and 13, each consisting of two stages. Field winding 2 is connected to the full wave output of bridge rectifier 10 and field winding 3 is connected to the full wave output of bridge rectifier 11, the rectifiers 10 and 11 being included in the outputs of the pair of two-stage amplifiers 12 and 13, respectively.

The common input to the amplifiers 12 and 13 consists of a unidirectional control potential whose magnitude and direction are determinative of the speed and direction of rotation of motor armature 1. This input signal is applied to terminals 14 and 15. A tachometer generator 16 is mechanically coupled to the armature 11, this coupling being diagrammatically indicated by the broken line 17. The output of tachometer generator 16 is filtered by a resistance-capacitance network 18 for removing commutator ripple and the filtered output is applied to the fixed resistance portion of a potentiometer 19. An adjustable fraction of this output is connected differentially as a bucking potential between the signal input terminal 15 and the input of a direct current amplifier 20. The direct current amplifier 20 may be of any desired conventional type and the specific details of its internal circuit arrangements have therefore been omitted from the drawing for simplicity of illustration.

The adjustably selected fraction of the filtered output voltage from tachometer generator 16 is bucked against the input signal voltage applied to input terminals 14 and 15 so that the net signal voltage, or error signal, applied to the input of the direct current amplifier 20 is balanced out to an appropriate extent when the motor armature 1 is rotating in the direction and at the speed called for by the input signal voltage at terminals 14 and 15, the magnitude of the error signal at any speed being such as to cause field excitation of the motor to give the speed called for by the input signal with accuracy over a wide range of mechanically driven load conditions. The network 21 comprises a parallel connected resistor-capacitor combination in series with the input to amplifier 20. This network provides a greater response of the control system to a rapidly changing input signal than it does to a slowly changing input signal.

When the speed and direction of rotation of the motor armature 1 differs from the conditions called for by the input signal, the net signal voltage, or error signal which is applied to input of amplifier 20 and which appears at the output of this amplifier will vary to cause correction of this discrepancy. The magnitude and polarity of this error signal will vary in accordance with the magnitude and direction of deviation of the speed of rotation of motor armature 1 from the direction and speed of rotation called for by the input signal at terminals 14 and 15.

The amplified error signal from the output of amplifier 20 is applied to the serially connected pairs of control windings 23—24 and 25—26 of two pairs of saturable reactors 27—28 and 29—30, respectively. The pair of saturable reactors 27—28 is included in the input of the magnetic amplifier 12 and the other pair of saturable reactors 29—30 is included in the input of the magnetic amplifier 13.

Each of the saturable reactors 27, 28, 29 and 30 is provided with a biasing winding 31 energized from an individually adjustable source of direct current 32, diagrammatically indicated as a variable battery. The adjustable source of direct current 32 may take the form of a common battery, rectifier or like source of direct current connected to each of the biasing windings 31 through an individual adjustable resistor, potentiometer, or similar device, appropriate precautions being taken in known manner, to prevent any undesired coupling effects among saturable reactors 27 to 30 which may arise from the energization of their biasing windings 31 from a common source of direct current. The biasing windings 31 permit individual adjustment of the saturable reactors 27 to 30 to obtain balanced conditions of operation, and to eliminate undesired residual currents.

The saturable reactors 27, 28, 29 and 30 are each provided with individual output or load windings 33, 34, 35 and 36, respectively. The load windings 33—34 of the pair of saturable reactors 27—28 are serially connected to provide an input for the second stage of the amplifier 12. The load windings 35—36 of the pair of saturable reactors 29—30 are similarly serially connected to provide an input for the second stage of the amplifier 13.

The pair of saturable reactors 27—28 is connected to form a self-excited magnetic amplifier, the power input terminals 37 of amplifier 12 being arranged for connection to a suitable source of alternating current which is preferably an individual and separate transformer secondary winding (not shown). The power input terminals 38 of amplifier 13 are similarly arranged to be energized from a separate transformer secondary winding of substantially the same voltage as the secondary winding connected to the terminals 37 of amplifier 12.

Amplifier 12 is shown provided with four half-wave rectifier units 39, 40, 41 and 42 which cause the amplifier 12 to be polarity sensitive with respect to its input signal. Assuming current flow between power terminals 37 to be to the left, current will flow downwardly through load winding 34 and through rectifier 42, the circuit being completed by upward current flow through the input of the second amplifier stage, to be described, and down through the rectifier 40. When the direction of current flow between power terminals 37 is reversed during the next half cycle, so that it is toward the right, current will flow downwardly through the rectifier 41 and again upwardly through the input of the second amplifier stage, passing to the left through rectifier 39 and downwardly through load winding 33. In this manner, the load windings 33 and 34 of the saturable reactors 27 and 28 are alternately subjected to half-wave excitation in the same direction, the combined full-wave output of the two load windings 33 and 34 being applied to the input of the second amplifier stage.

The output from the first stage of amplifier 12 is thus determined by the half-wave impedances of the two load windings 33 and 34. If the polarity of the input signal applied to the control windings 23 and 24 is cumulative with respect to the direction of current flow through the rectifiers, the half-wave impedances of the load windings 33 and 34 will be reduced and an input will be applied to the second amplifier stage. If, however, the polarity of the input signal applied to the control windings 23 and 24 is such as to buck or oppose the magnetization caused by current flowing through the rectifiers 39 to 42, then the half-wave impedances of the load windings 33 and 34 will be increased, and the signal, if any, applied to the input of the second amplifier stage will be reduced. In this manner, the second amplifier stage receives an input only from a first stage input signal of a predetermined polarity and in accordance with the magnitude of the first stage input signal.

Amplifier 13 is provided with four half-wave rectifier units 43, 44, 45 and 46 which are connected in the same way as the rectifier units 39 to 42 of amplifier 12, and operate in the same manner as described above. The input connections to the control windings 25 and 26 of the pair of saturable reactors 29—30 of amplifier 13, however, are reversed with respect to the corresponding connections of amplifier 12. Thus, a signal whose polarity produces a response in amplifier 12 produces no response in amplifier 13, and vice versa.

The second stage of amplifier 12 comprises two further saturable reactors 47 and 48 provided with input or control windings 49 and 50. The control windings 49 and 50 are serially connected in a circuit including the resistor 51 and receive the full-wave unidirectional output of the first amplifier stage, as described above. The resistor 51 is for the purpose of adjusting the interstage impedance characteristics of amplifier 12.

The saturable reactors 47 and 48 are provided with biasing windings 52 connected for individual energization from the adjustable sources of direct current 53, each illustratively indicated by the circuit symbol for a variable battery. As in the case of adjustable direct current sources 32, described above, a common source may be used together with provision for the individual adjustment of the currents in the two biasing windings.

The load windings 54 and 55 of the second stage saturable reactors 47 and 48 are connected through half-wave rectifier units 56 and 57 to the full-wave bridge rectifier 10 in the output of amplifier 12. The output for the second amplifier stage is energized at the power input terminals 58 which are adapted to be connected to an individual and separate transformer secondary winding (not shown) for supplying alternating current thereto. Since the input to the saturable reactors 47 and 48 of the amplifier second stage is always of the same polarity, only the two half-wave rectifier units 56 and 57 are required for effective control of the output current. The half-wave rectifier units 56 and 57 are connected to divert successive half-waves of one polarity through the load winding 54 of the saturable reactor 47 and half-waves of the opposite polarity through the load winding 55 of the other saturable reactor 48. The individual half-wave outputs of the two load windings 54 and 55 are applied alternately and with opposite polarities to the alternating current input terminals 59 and 60 of the full-wave bridge rectifier 10.

Similarly, the second stage of the other amplifier 13 comprises the saturable reactors 61 and 62 with serially connected control windings 63 and 64 connected in a circuit including the interstage impedance adjusting resistor 65. The reactors 61 and 62 are provided with biasing windings 66 energized from adjustable sources of direct current 67. The load windings 68 and 69 of the saturable reactors 61 and 62 are connected through the oppositely poled half-wave rectifier units to deliver the resultant alternating current output from the second amplifier stage to the alternating current input terminals 72 and 73 of the full-wave bridge rectifier 11. The various circuit elements of the magnetic amplifier 13 are connected in the same way as the corresponding circuit elements of the magnetic amplifier 12 described above and operate in the same manner.

From the foregoing, it will be seen that with an error signal of one predetermined polarity, an output will be delivered by the magnetic amplifier 12 and with an error signal of the opposite polarity, the magnetic amplifier 13 will deliver an output. The magnitude of the error signal will be determinative of the magnitude of the output from whichever amplifier is responsive thereto.

For the purpose of increasing the accuracy of control, a regenerative feedback loop is provided from the outputs of the magnetic amplifiers 12 and 13 to the inputs of their respective second stages. This regenerative feedback loop extends from the negative output terminal 74 of the bridge rectifier 10, through a resistor 75, an inductor 76, and the feedback windings 77, 78, 79 and 80 of saturable reactors 47, 48, 61 and 62, respectively, to the negative output terminal 81 of the other bridge rectifier 11.

Since the direction of current flow through the regenerative feedback loop will be determined by the rectifier 10 or 11 whose negative output terminal 74 or 81 is at the higher potential, the direction of current flow through the feedback windings 77 and 78 of the second stage of amplifier 12 is reversed with respect to the direction of current flow through the feedback windings 79 and 80 of the second stage of amplifier 13. The feedback windings are so poled, that the regenerative action tends to increase the output from which ever of the two amplifiers 12 or 13 is delivering an output in response to the error signal.

In order to avoid hunting or other undesirable effects of an oscillatory nature, the regenerative feedback loop is retarded by the inclusion therein of the serially connected inductor 76. The resistor 75 is also serially connected in this regenerative feedback loop for determination or adjustment of both the inductance to resistance ratio of the feedback loop and the amount of regenerative feedback provided thereby. The inductance to resistance ratio of the feedback loop controls the time constant of the loop, and thereby determines the response time, the amount of damping and the rate of decay of the regenerative feedback effect. Accordingly, the inductor 76 retards or delays the regenerative effects at its beginning and prolongs the regenerative effect after it would otherwise have terminated.

An armature current boosting feedback loop is provided for the purpose of increasing the armature as the field current increases, thereby increasing the torque of the motor when the error signal calls for rapid changes in armature acceleration.

The armature current boosting feedback loop extends from the common junction point 82 which is connected to the positive output terminals of the two bridge rectifiers 10 and 11, through the conductor 83 and the serially connected control windings 84, 85 and 86 of the saturable reactors 4, 5 and 6, respectively, and a conductor 87 to the junction point 88 common to the two motor field windings 2 and 3. The armature current boosting loop is thus included in a common connection extending from the junction point of the two positive terminals of the bridge rectifiers 10 and 11 to the junction point of the two field windings 2 and 3, so that current flows therethrough in the same direction regardless of whether amplifier 12 is supplying field current to the motor field winding 2 or amplifier 13 is supplying field current to the motor field winding 13. This direct application of the field current to the saturable reactors which control the armature current produces the desired increased armature current for obtaining increased torque when a rapid armature acceleration is called for by the error signal. The field current increases in accordance with the magnitude of the error signal, the torque being approximately proportional to the product of field current and armature current.

A further supplementary armature current control circuit is provided which is effective during dynamic braking to prevent the armature current from increasing beyond the magnitude of the current generated by the armature during dynamic braking. This control circuit includes a polarity sensing rectifier 89 connected in series with the three control windings 90, 91 and 92 of the saturable reactors 4, 5 and 6, respectively. The armature voltage is thus fed back to the armature current control reactors 4, 5 and 6 under conditions when the armature terminal voltage tends to increase the current flow through the rectifiers 7, 8 and 9. The effect of the current thus fed back through the polarity sensing rectifier 89 acts upon the control windings 90, 91 and 92 of the main armature current control reactors 4, 5 and 6, to increase their reactances and thereby reduce the rectifier current, thus offsetting the increase in rectifier current which would otherwise occur.

The direction of current flow through rectifier 89 and control windings 90, 91 and 92 is arranged to oppose the effects of current flow between the common field circuit terminals 82 and 88 passing the other set of control windings 84, 85 and 86, so that an increase in armature current called for by the field current is offset or cancelled during periods when the terminal voltage of the armature is reversed. This avoids a severe plugging condition which would otherwise arise. It also improves commutation by causing armature deceleration immediately preceding reversal of the direction of armature rotation to cause high field current and reduced armature current. Additionally, this avoids overheating of the armature 1 and the rectifiers 7, 8 and 9 of the three phase full-wave bridge.

A sensitivity control is provided and is shown illustratively as a mechanically variable shunt resistor 93 connected across the input terminals of the direct current amplifier 20. It has been found in practice, that the control system of the present invention is capable of operation using greater sensitivity at low armature speeds than at relatively high speeds. Accordingly, the variable resistor 93 may be connected by the mechanical connection illustrated diagrammatically by the broken line 94 to any mechanical device whose physical displacement varies the magnitude and direction of the input signal applied to terminals 14 and 15, the mechanical connection being so arranged that the resistance value of the variable resistance 93 is greater for low magnitudes of input signal than for higher values thereof. Since the variable resistor 93 is shunted across the input of the amplifier 20, the amplifier sensitivity and hence that of the control system will be greater for the larger resistance values at low magnitudes of input signal and the accompanying low motor speeds than for high values of input signal which call for relatively high motor speeds, thus taking full advantage of the maximum permissible sensitivity for the control system. Other forms of amplifier sensitivity control may be used, such as grid bias and similar control means, and means of this character may be appropriately connected for control from the control signal originating device, or from the input signal applied to input terminals 14 and 15. Variable gain amplifiers are known in the art, and any appropriate type may be used, including the use of any necessary filtering to prevent undesired feedback effects.

It should also be noted, that as shown and described in Patent No. 2,709,234, the undesired effects of inductive coupling between the two motor field windings 2 and 3 is prevented. In the present invention, only the suitably poled connections of the bridge rectifiers 10 and 11, are used, the feedback loop and amplifying means of the co-pending application being omitted. A rapidly changing field current in winding 2, for example, calling for an increase in armature speed in the corresponding direction, induces a voltage in field winding 3 by reason of the mutual inductance between field windings 2 and 3 which is inherent in the motor structure. The direction of this induced voltage is such that it tends to delay and to oppose the desired increase in the excitation of field winding 2, if any current is permitted to flow in response to this induced voltage.

Such current flow is prevented, however, by the inductance of the control windings 84, 85 and 86 connected between terminals 82 and 88, the polarity of the voltage drop between terminals 82 and 86 produced by rectifier 10 being such as to oppose the flow of the induced current in field winding 3 which is a forward direction with respect to rectifier 11. If the induced voltage in winding 3 rises sharply to a high value, current flow in response thereto is opposed by the inductance of control windings 84, 85 and 86 and also by the oppositely poled rectifier 10. The undesired effects of mutual inductance between the field windings 2 and 3 are thus avoided.

I have shown what I believe to be the best embodiments of my invention. I do not wish, however, to be confined to the embodiments shown, but what I desire to cover by Letters Patent is set forth in the appended claims.

I claim:

1. A control system for a direct current electric motor having an armature and a field winding, said control system comprising: a saturable reactor having inherent constant current characteristics adapted for connection to a source of alternating current, said reactor including a control winding for regulation of the reactance thereof; rectifier means connected to said reactor and adapted to supply armature current to said motor; means for supplying a field current to said field winding for controlling the rotation of said armature; and circuit means for causing at least a portion of said field current to flow through said reactor control winding in the direction which causes an increased armature current to be produced by increased field excitation, whereby increased torque is provided for rapid acceleration of said armature.

2. A control system according to claim 1, further comprising: an additional control winding included in said reactor and connected to said armature; and polarity sensing means included in said last-named connection for permitting current to flow through said additional control winding in one direction only, the polarity of said sensing means and of said additional control winding being such as to tend to reduce the armature current when the armature voltage tends to increase said armature current flowing through said rectifier means during dynamic braking operation of said armature.

3. A control system according to claim 2, wherein said polarity sensing means is a rectifier.

4. A control system for a direct current electric motor having an armature and a field winding, said control system comprising: a saturable reactor adapted for connection to a source of alternating current, said reactor including a control winding for increasing the reactance thereof; rectifier means connected to said reactor and adapted to supply armature current to said motor; means for supplying field current to said field winding for controlling the rotation of said armature; and circuit means including polarity sensing means connecting said armature to said control winding, the polarity of said sensing means being such that the reactance of said reactor is increased when the armature voltage tends to increase the armature current flowing through said rectifier means during dynamic braking operation of said armature.

5. A control system according to claim 4 in which said polarity sensing means is a rectifier.

6. A control system for a direct current electric motor having an armature and a separate field winding for each direction of rotation, said field windings being inductively coupled together, said control system comprising: means for supplying generally constant armature current to said motor; means including amplifying means for selectively and individually supplying field current to said two field windings of said motor for controlling the speed and direction of rotation of said armature, said amplifying means comprising rectifier means connected separately and directly to each of said field windings, said rectifier means being poled to prevent the flow of current therethrough from either field winding which would otherwise flow as a result of said inductive coupling between said field windings.

7. A control system for a direct current motor having an armature and two field windings, excitation of one field winding causing rotation of said armature in one direction and excitation of the other field winding causing rotation of said armature in the opposite direction, said control system comprising: saturable reactor means having inherent constant current characteristics adapted for connection to a source of alternating current, said reactor means including control winding means for varying the reactance thereof; rectifier means connected to said reactor and adapted to supply generally constant current to said armature; a pair of polarity sensing amplifying means each connected for individual response to a common input signal of a different polarity and each connected to supply field current to one of said two field windings, the magnitude of said field current being in accordance with the magnitude of said input signal; and a common circuit connection carrying unidirectional current from both of said amplifiers to both of said field windings, said common connection including said control winding means of said saturable reactor means for increasing said armature current in accordance with the amount of field current supplied to either of said field windings.

8. A control system according to claim 7, further comprising means for deriving a unidirectional bucking potential in accordance with the speed and direction of rotation of said armature, said bucking potential being applied to oppose said input signal.

9. A control system according to claim 8, further comprising time delay filter means interposed in said connection between said bucking potential and said input signal.

10. A control system according to claim 8, in which said bucking potential deriving means comprises a tachometer generator driven by said armature.

11. A control system according to claim 7 further comprising a regenerative feedback loop extending from said field windings to both of said amplifying means for increasing the output of whichever of said amplifying means is supplying field current to said one of said field windings.

12. A control system according to claim 11, further comprising a reactive circuit element included in said regenerative feedback path for retarding the regenerative effect thereof at its beginning and for prolonging said regenerative effect after it would otherwise have terminated.

13. A control system according to claim 12, in which said reactive circuit element is an inductor.

14. A control system according to claim 7, further comprising additional control winding means for increasing the reactance of said saturable reactor means and circuit means including polarity sensing means connecting said armature to said additional control winding means, the polarity of said sensing means being such that the reactance of said reactor is increased when the armature voltage tends to increase the current flowing through said rectifier means during dynamic braking operation of said armature.

15. A control system according to claim 14, in which said polarity sensing means is a rectifier.

16. A control system according to claim 7, further comprising network means connected to said amplifier for making the response of said control system to a rapidly changing input signal greater than to a slowly changing input signal.

17. A control system according to claim 7, further comprising means for varying the sensitivity of said control system, said sensitivity varying means being adapted for connection to vary the response of said control system for reducing the response thereof to input signals of relatively large magnitude and increasing the response thereof to input signals of relatively small magnitude.

18. A control system for a direct current motor having an armature and two field windings, excitation of one field winding causing rotation of said armature in one direction and excitation of the other field winding causing rotation of said armature in the opposite direction, said control system comprising: saturable reactor means having inherent constant current characteristics adapted for connection to a source of alternating current, rectifier means connected to said reactor and adapted to supply generally constant current to said armature; a pair of polarity sensing amplifying means each connected for individual response to a common input signal of a different polarity and each connected to supply field current to one of said two field windings, the magnitude of said field current being in accordance with the magnitude of said input signal; and a regenerative feedback loop extending from said field windings to both of said amplifying means for increasing the output of whichever of said amplifying means is supplying field current to said one of said field windings.

19. A control system according to claim 18, further comprising a reactive circuit element included in said regenerative feedback path for retarding the regenerative effect thereof at its beginning and for prolonging said regenerative effect after it would otherwise have terminated.

20. A control system according to claim 19, in which said reactive circuit element is an inductor.

References Cited in the file of this patent

UNITED STATES PATENTS

| | | | |
|---|---|---|---|
| 1,420,858 | Meyer | June 27, | 1922 |
| 1,428,588 | Hawkins | Sept. 12, | 1922 |
| 2,115,086 | Riggs | Apr. 26, | 1938 |
| 2,421,632 | Livingston | June 3, | 1947 |
| 2,453,451 | Mosley | Nov. 9, | 1948 |
| 2,677,088 | Malick | Apr. 27, | 1954 |

FOREIGN PATENTS

| | | | |
|---|---|---|---|
| 549,318 | Great Britain | Nov. 16, | 1942 |